United States Patent
Brochard et al.

(10) Patent No.: US 9,292,703 B2
(45) Date of Patent: Mar. 22, 2016

(54) ELECTRONIC DOCUMENT MANAGEMENT METHOD

(75) Inventors: Pierre Brochard, Saint Cheron (FR); Didier Courtaud, Boissise le Roi (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 520 days.

(21) Appl. No.: 12/162,210

(22) PCT Filed: Jan. 25, 2007

(86) PCT No.: PCT/FR2007/050692
§ 371 (c)(1),
(2), (4) Date: Oct. 9, 2008

(87) PCT Pub. No.: WO2007/085768
PCT Pub. Date: Aug. 2, 2007

(65) Prior Publication Data
US 2009/0172018 A1    Jul. 2, 2009

(30) Foreign Application Priority Data
Jan. 26, 2006  (FR) ..................... 06 50268

(51) Int. Cl.
*G06F 17/30* (2006.01)
*G06F 21/62* (2013.01)
*G06F 21/10* (2013.01)

(52) U.S. Cl.
CPC ............ *G06F 21/6218* (2013.01); *G06F 21/10* (2013.01); *G06F 17/30908* (2013.01); *G06F 17/30911* (2013.01)

(58) Field of Classification Search
None
See application file for complete search history.

(56) References Cited

U.S. PATENT DOCUMENTS

| | | | | |
|---|---|---|---|---|
| 6,754,702 | B1 * | 6/2004 | Kennelly et al. | 709/223 |
| 7,505,976 | B2 * | 3/2009 | Kudo | |
| 7,617,520 | B2 * | 11/2009 | Naizhen et al. | 726/1 |

(Continued)

FOREIGN PATENT DOCUMENTS

| | | |
|---|---|---|
| EP | 0 615 192 A1 | 9/1994 |
| EP | 1 276 035 A2 | 1/2003 |

(Continued)

OTHER PUBLICATIONS

Damiani E. et al.: "Controlling Access to XML Documents," IEEE Internet Computing IEEE USA, [Online] vol. 5, No. 6, Nov. 2001, pp. 18-28, XP-002438745. Retrieved from the Internet: URL:http://ieeexplore.ieee.org/iel5/4236/20897/00968827.pdf?tp=&arnumber=968827&isnumber=20897> [retrieved on Jun. 21, 2007] p. 21-p. 27.

(Continued)

*Primary Examiner* — Charles Adams
(74) *Attorney, Agent, or Firm* — The Webb Law Firm

(57) ABSTRACT

Methods of managing electronic documents that can be implemented by a server in a telecommunications network are described. One method includes a receiving step of receiving a request from a client device, said request containing at least a user identifier and an electronic document name; an obtaining step of obtaining from the document name a secret identifier of at least one field of said document; a checking step of verifying from the user identifier and the secret field identifier whether a content associated with said field may be sent to the client device in response to the request; and where appropriate a sending step of sending said content to the client device.

20 Claims, 2 Drawing Sheets

(56) References Cited

U.S. PATENT DOCUMENTS

| | | | |
|---|---|---|---|
| 7,627,766 B2 * | 12/2009 | Chen et al. ................ | 713/182 |
| 7,630,984 B2 * | 12/2009 | Qi | |
| 7,783,616 B2 * | 8/2010 | Moses ..................... | 707/705 |
| 8,145,668 B2 * | 3/2012 | Van Der Linden et al. ... | 707/778 |
| 2004/0128556 A1 | 7/2004 | Burnett | |

FOREIGN PATENT DOCUMENTS

| | | |
|---|---|---|
| JP | 07-225 765 | 8/1995 |
| JP | 08 161 214 | 6/1996 |
| JP | 11 242625 A | 9/1999 |
| JP | 2004-259-195 | 9/2004 |
| JP | 2005-055 998 | 3/2005 |

OTHER PUBLICATIONS

Beiser K: "Getting Grabby: Offline Web Browsing," Online, Mar. 1997, pp. 1-6, XP-002182809.

Powell T.A. et al.: "HTML Programmer's Reference, Appendix A URL Primer" HTML Programmer's Reference, 1998, pp. 355-377, XP-002228395.

International Search Report mailed Jul. 4, 2007, issued in PCT/FR2007/050692 (filed Jan. 25, 2007).

* cited by examiner

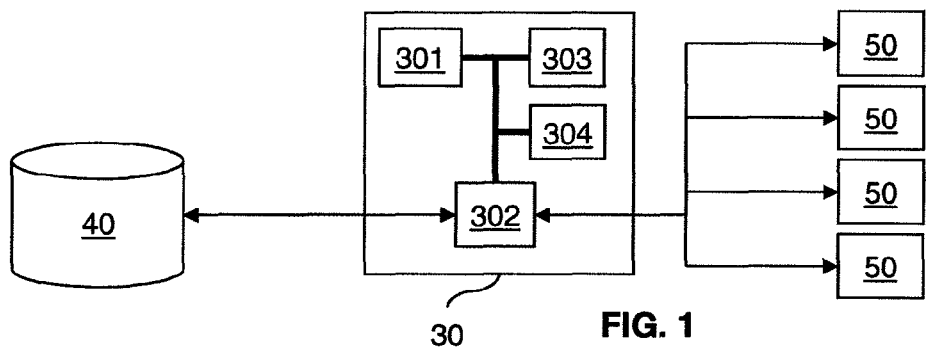
FIG. 1
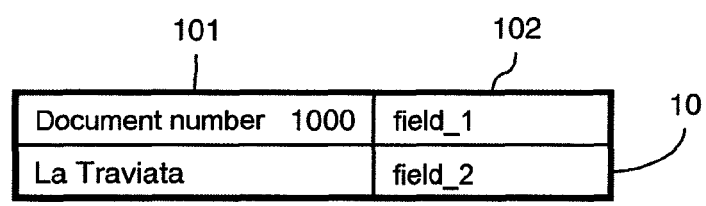
FIG. 2A
| 201 | 202 | 203 | 204 |
|---|---|---|---|
| field_1 | Document | field_3225<br>field_3226 | 0 |
| field_12325 | Title | Documentation X | 0 |
| field_3225 | Header | Document dated 1/1/06<br>field_12325<br>field_12326 | 1 |
| field_12326 | Author | Pierre Brochard | 3 |
| field_3226 | Document body | field_13100 | 1 |
| field_13100 | Chapter | field_13200<br>field_13201 | 0 |
| field_13200 | Chapter title | Importing documents | 0 |
| field_13201 | Paragraph | This chapter describes importing documents into the base | 0 |
FIG. 2B

ELECTRONIC DOCUMENT MANAGEMENT METHOD

This application is a §371 national phase filing of PCT/FR2007/050692 filed Jan. 25, 2007, and claims priority to French Appin. No. 0650268 filed Jan. 26, 2006.

BACKGROUND OF THE INVENTION

The invention relates to a method of managing electronic documents and to a server suitable for implementing the method.

In this specification, the term "document" is used to designate any set of information representing a unit that can be considered as being indivisible and complete.

As non-limiting examples, a book, a memorandum, a report, a note, a film, and a music album are all documents in the meaning of this patent application.

For example, a document may be a multimedia document, as applies to a film.

The term "electronic document" is used to designate the representation of a document in the form of a computer data structure suitable for being stored in the memory of a computer and capable of being transmitted from one computer to another via a telecommunications network.

An electronic document may possibly correspond to an existing document on a traditional medium.

The invention relates more particularly to a secure method of managing electronic documents that makes it possible to authorize or to restrict user access to portions of said documents.

In this specification, any identifiable portion of an electronic document is referred to as a "field".

The fields of an electronic document are defined by an administrator, a person in charge of electronic document management, or by any other user seeking to provide an electronic document that is to be managed by the method and the server of the invention.

For example, a user may decide to define the following fields: "Title", "Header", "Chapter", for an electronic document obtained by scanning a traditional book.

Similarly, in a music album, it is possible to define fields for each of the pieces of music in the album.

In the present state of the art, no electronic document management method is known that is suitable for managing access to portions of electronic documents, i.e. to fields. The only access rights management systems that are known at present define rights that are applicable to entire categories of documents, or to electronic documents in full.

OBJECT AND SUMMARY OF THE INVENTION

A main object of the present invention is to mitigate that drawback.

More precisely, the invention relates to a method of managing electronic documents that is suitable for being implemented on a server in a telecommunications network. The method comprises:

a receiving step of receiving a request coming from a client device, said request containing at least a user identifier and an electronic document name;

an obtaining step of obtaining from said document name a secret identifier of at least one field of said document;

a checking step of verifying from said user identifier and from said secret field identifier whether a content associated with said field may be sent to the client device in response to said request; and where applicable a sending step of sending said content to said client device.

Correspondingly, the invention relates to a document server that comprises:

receiving means for receiving a request coming from a client device, said request containing at least a user identifier and an electronic communications name;

obtaining means for obtaining from said document name a secret identifier of at least one field of said document;

checking means suitable for verifying from said user identifier and from said secret field identifier, whether a content associated with said field may be sent to said client device in response to said request; and sending means for sending said content to said client device.

It should firstly be observed that, in highly advantageous manner, the electronic documents managed by the invention are not themselves modified.

In accordance with the invention, access to the documents is controlled on the basis of the user identifier and of secret field identifiers for the document, with none of these identifiers being stored in the documents.

This characteristic turns out to be fundamental when the volume of documents to be processed is very large, or when the documents might themselves vary over time, e.g. when new versions become available.

It should also be observed that in highly advantageous manner, the user gains access, after verification of rights, to the document itself.

The invention thus differs from systems in which it is necessary to copy document portions that are authorized for a given user into a temporary or permanent file that is limited to those portions only, which file is freely accessible by the user.

In accordance with the invention, each field of the document can be accessed independently of the others on the basis of a secret identifier that is unknown to the user.

In order to ensure that the document management method and the document server in accordance with the invention are highly secure, it is essential for this identifier to remain secret. This assumes that the identifier cannot easily be obtained by the user.

In particular, any identifier obtained directly by a system command from the name of the document must not constitute an identifier that is secret in the meaning of the invention, since otherwise an ill-intentioned user with knowledge of such a command and the name of the document could access portions of the document to which he is not entitled.

A URL (uniform resource locator) is public by nature and therefore cannot be a secret identifier in the meaning of the invention.

It is also important to observe that, in accordance with the invention, the secret identifier is associated with a field of the document.

Under no circumstances is it a secret identifier associated with the user, such as a password, independently of the documents.

This characteristic makes it possible to provide a high degree of granularity in terms of security since the access rights of a user can be verified for each access to a document, or indeed for each access to a portion of a document.

In accordance with the invention, client devices cannot access the electronic documents directly, but need to interrogate the server of the invention by sending a request of the above-specified type.

Users can obtain documents in full or only certain fields of those documents, but under all circumstances, the method and the server of the invention verify for each field of the document whether the content associated with that field (text, image, sound, video, arbitrary data of specified type) may be sent to the user identified in the request, depending on that user's own access rights.

In a particular implementation, the request includes at least one public identifier of a field of the document, and during the obtaining step, the above-mentioned secret identifier is obtained from said public identifier.

In the above-mentioned example, the public identifier of a field may be the identifier "title" or "header".

Such a request is issued by the client device when the user of the client device seeks to obtain one or more fields of the document as opposed to the entire document.

In a particular implementation of the invention, a document field includes at least one sub-field, and the management method of the invention includes a checking step during which it is verified from the user identifier and the secret field identifier whether the sub-field should be processed by the method in similar manner to the field.

This characteristic enables documents to be processed recursively when portions of the document contain sub-portions.

In accordance with the invention, access rights may be defined in such a manner that the content of a field is not accessible to a user, even though the contents of sub-fields of that field are themselves accessible. Such a field is said to be "crossable" but "not authorized".

Thus, access rights can be subdivided into two types:
the right to cross a given field, i.e. to obtain the list of sub-fields included in said field but without providing the content of the field itself, the access to the sub-fields being authorized or not authorized for a given user; and
the right to access the content of a field.

In a particular implementation, the obtaining step includes a step of parsing a tree in which each leaf represents a field of the document and includes a list of sub-fields contained in the field.

In a particular implementation, the various steps of the document management method are determined by computer program instructions.

Consequently, the invention also provides a computer program on a data medium, the program being suitable for being implemented in a server, or more generally in a computer, the program including instructions adapted to implementing the steps of a document management method as described above.

The program may make use of any programming language, and it may be in the form of source code, object code, or of code intermediate between source code and object code, such as in a partially-compiled form, or in any other desirable form.

The invention also provides a data medium that is readable by a computer and that contains computer program instructions as mentioned above.

The data medium may be any entity or device that is capable of storing the program. For example, the medium may comprise a storage medium such as a read-only memory (ROM), e.g. a CD-ROM, or a microelectronic circuit ROM, or indeed magnetic recording means, e.g. a floppy disk or a hard disk.

Furthermore, the data medium may be a transmissible medium such as an electrical or optical signal, that can be conveyed via an electrical or optical cable, by radio, or by other means. The program of the invention may in particular be downloaded over a network of the Internet type.

Alternatively, the data medium may be an integrated circuit in which the program is incorporated, the circuit being adapted to execute or to be used in the execution of the management method.

BRIEF DESCRIPTION OF THE DRAWINGS

Other characteristics and advantages of the present invention appear from the following description made with reference to the accompanying drawings that show an implementation having no limiting character. In the figures:

FIG. 1 shows a server constituting a particular embodiment of the invention, the server being shown in its environment;

FIGS. 2A and 2B show data structures used in a particular implementation of the invention;

DETAILED DESCRIPTION OF AN EMBODIMENT

FIG. 1 is a diagram showing a server 30 in accordance with the invention.

The hardware architecture of the server 30 is that of a conventional computer. It comprises a processor 301, a ROM 303 suitable for containing computer programs, a random-access memory (RAM) 304 needed to enable the processor 301 to execute said computer programs, and communications means 302 constituted by a network card and by software drivers.

Figure 4:
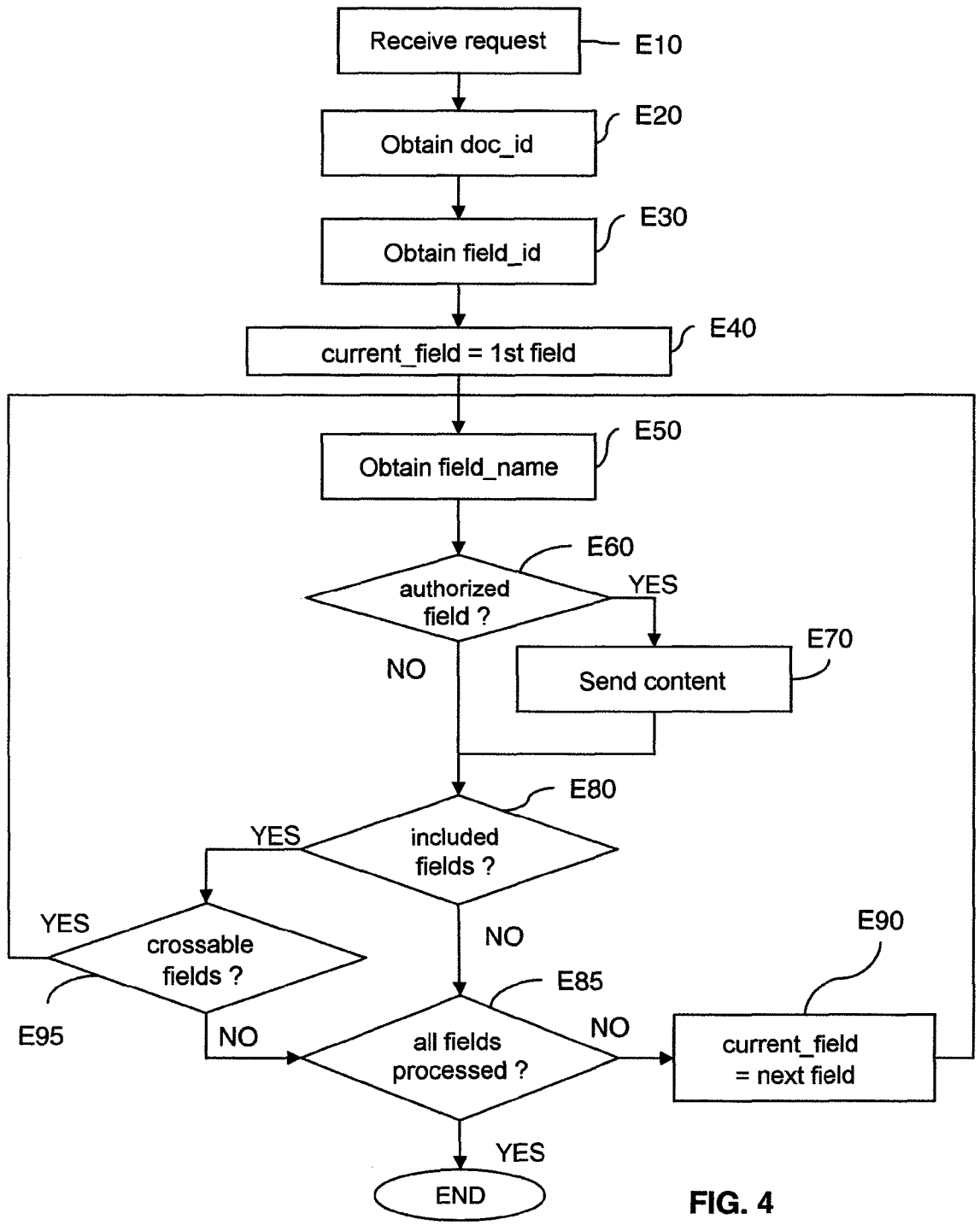
FIG. 4 is a flow chart showing the main steps of the method of the invention for managing electronic documents.

The ROM 303 includes a computer program in accordance with the invention with instructions suitable for executing the steps of the management method shown as a flow chart in FIG. 4.

In the presently-described example, the server 30 is connected via a telecommunications network (no reference) to a plurality of client devices 50. The telecommunications network connecting the server 30 to a client device 50 may be of any type, and in particular it may be a local network of the Ethernet type or a public network of the Internet type.

In the presently-described example, the server 30 accesses a document base 40 containing a set of electronic documents.

In the description below, it is assumed that the document base 40 stores a text document and a multimedia document having names known to the users of the clients 50, which names are respectively "Document number 1000" and "La Traviata".

FIG. 2A shows a first data structure 10 having a column 101 in which there are stored all of the names of the electronic documents of the document base 40.

This first data structure 10 has a second column 102 enabling each of the document names to be associated with a unique internal identifier of the document, this internal identifier being secret and unknown to the users of the client devices 50.

Thus, in the presently-described example, the internal identifier "field_1" is associated with the document having the name "Document number 1000", and the internal identifier "field_2" is associated with the document having the name "La Traviata".

Appendix 1 gives the contents of the electronic document having a name "Document number 1000". In the presently-described example it is assumed that a plurality of fields are defined for this electronic document. The public identifiers of these fields are "Title", "Header", "Author", "Document body", "Chapter", "Chapter title", and "Paragraph".

FIG. 2B shows a second data structure 20 having a column 202 containing each of the public identifiers of the fields of the document having the name "Document Number 1000".

A column 201 of this second data structure 20 associates each of the public field identifiers with a secret identifier that is not known to the users of the client devices 50.

By way of example, the public field identifier "Title" is associated with the secret identifier "field_12325".

The second data structure 20 has a third column 203 associating for each of the above-mentioned fields, the content of that field.

In the presently-described example, the content is either text, or a list of sub-fields.

For example, the content of the field of public identifier "Chapter title" is the text "Importing documents".

Similarly, the content of the field of public identifier "Header" comprises firstly the text "Document dated Jan. 1, 2006" and secondly the list of sub-fields of secret identifiers "field_12325" and "field_12326". With reference to the second and fourth rows of the second data structure 20, it can readily be understood that the "Header" field combines both the above-mentioned textual content and the fields "Title" and "Author" having the following respective contents: "Documentation X" and "Pierre Brochard".

The fourth column 204 of the second data structure 20 includes, for each of its fields, a value representative of the access level given to the user named "Dupond". In this example, these values may be:

0: field not authorized and not crossable;
1: field not authorized and crossable;
2: field authorized and not crossable; and
3: field authorized and crossable.

Figure 3:
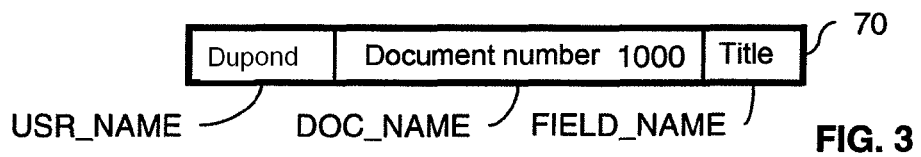
FIG. 3 shows a request used in a particular implementation of the invention.

FIG. 3 shows a request 70 as might be sent by a user of the client device 50 to the server 30 of the invention.

The request comprises three fields:
the field USR_NAME which contains the name of a user;
the field DOC_NAME which contains the name of an electronic document; and
the optional field FIELD_NAME which contains the public identifier of a field of the document.

In the example of FIG. 3, these fields comprise respective values: "Dupond", "Document number 1000", and "Title".

When the server 30 of the invention receives this request 70, it interprets it as a request issued by a user having the name Dupond who desires to obtain solely the field having the public identifier "Title" belonging to the document having the name "Document number 1000".

The server 30 of the invention processes this request 70 in application of the steps of the electronic document management method in accordance with the invention as described below with reference to FIG. 4.

During a first step E10, the server 3 of the invention receives the request via the communications means 302.

This receiving step E10 of receiving a request is followed by a step E20 during which the server 30 obtains in the first data structure 10 the internal identifier associated with the document named "Document number 1000" that is present in the field DOC_NAME of the request 70.

In the presently-described example, this internal identifier is "field_1".

This obtaining step E20 of obtaining an internal document identifier is followed by a step E30 during which the server 30 uses the second data structure 20 to obtain the list of secret identifiers for all of the fields of the document.

This step, which runs recursively, amounts to parsing a tree in which the leaves are constituted by the fields of the document, with the root of the tree being the field "field_1" obtained in the preceding step.

Thus, from the first row of the second data structure 20, the following fields "field _3225" and "field_3226" are obtained that constitute the first level of this tree.

Then, starting from the leaf "field_3225" it is possible to obtain from the third row of the second data structure 20 the fields "field_12325" and "field$_{13}$ 12326" that constitutes another level of this tree.

By parsing the entire second data structure 20 in this way, all of the secret file identifiers are obtained.

This obtaining step E30 is followed by a loop for processing all these fields obtained as mentioned, and constituted by steps E40 to E95.

During a step E40, a variable "current_field" stored in the RAM 304 is associated with the secret identifier of the first field obtained in the preceding step.

This step E40 is followed by a step E50 during which the public identifier associated with the current field is obtained. In the presently-described example, the first secret field identifier is "field_3225" and the public identifier of the associated field is "Header", as obtained from the third row of the second data structure 20.

This obtaining step E50 of obtaining the public identifier is followed by a checking step E60 during which a check is made on the rights of the user whose name was obtained in the field USR_NAME of the request 70 that was received during the first step E10.

Specifically, this field "Header" can be crossed, but the sending of its content is not authorized, because column 204 of the second data structure 20 associated with the field "Header" contains the value 1.

Given that the content of this field cannot be sent in response to the request 70, the result of the test E60 is negative. The textual content "Document dated Jan. 1, 2006" is therefore not sent to the user having the name "Dupond".

This test is then followed by a step E80 during which it is verified whether the current field includes sub-fields.

Specifically it does contain sub-fields and the test E80 is followed by the test E95 during which it is verified whether the current field is crossable.

Specifically, it is crossable and the method of the invention returns to step E50 to process the sub-fields "field_12325" and "field_12326" of the current field "field_3225".

For each of these sub-fields, the public identifiers "Title" and "Author" are obtained during this step E50.

During above-described test E60, the fourth column of the second data structure 20 is read to determine that only the field "Author" is an authorized field.

Consequently, the test E60 is followed by a step E70 during which the client device 30 responds to the request 70 by returning the content of the field "Author", i.e. the text "Pierre Brochard".

Step E60 of checking for the sub-field "Title" and step E70 of checking for the sub-field "Author" are followed by the test E80 during which it is determined whether these sub-fields themselves contain at least one sub-field.

Since they do not, for both of these steps the result of the test E80 is negative.

This test is followed by a step E85 during which it is determined whether all of the sub-fields of the field "field_3225" have been processed.

Since they have, the method of processing the field "field_3225" terminates.

Recursively, the method then processes the field "field_3226" and during above-described step E50 it obtains the public identifier of this field, i.e. "Document body".

During checking step E60, it is determined that this field is not an authorized field, since the fourth column of the second data structure 20 contains the value 0.

Thus, this checking step E60 is followed by a test E80 during which it is determined whether the field "Document body" includes sub-fields.

It does, since the content of the field "Document body" contains the sub-field "field_13100".

This test E80 is then followed by the above-described E95 during which it is determined whether the field "field_3226" is crossable.

Specifically it is not, so this test is followed by above-described step E85 during which it is determined whether all of the fields "field_3225" and "field_3226" have been processed.

Since they have, the electronic document management method of the invention terminates, in this particular implementation.

APPENDIX 1

Document number 1000
Header: Document dated Jan. 1, 2006
Title: Documentation X
Author: Pierre Brochard
Document body:
Chapter:
Chapter title: Importing documents
Paragraph: This chapter describes importing documents into the base

The invention claimed is:

1. A method of managing an electronic document suitable for implementation by a server in a telecommunications network, the method comprising:
defining a plurality of public identifiers and respective associated secret identifiers for said document, each public identifier and associated secret identifier being associated with at least one defined field of said document, each secret identifier being an internal identifier for the associated at least one defined field of said document, said public identifiers and said associated secret identifiers not being stored in said document, and said secret identifiers being unavailable for public access;
receiving a request from a client device, said request including at least a user identifier and an electronic document identifier that references said document;
obtaining at least a portion of said secret identifiers for said document based on said electronic document identifier;
obtaining, for each field identified by a secret identifier in the portion of said secret identifiers, at least one selected public identifier associated with the field identified by the secret identifier in accordance with a predetermined field access definition associated with the field,
wherein a predetermined field access definition associated with a field comprises a first access level indicating whether the user is authorized to access data stored in a content of the field, and a second access level indicating whether the user is authorized to access a list of sub-fields stored in the content of the field;
determining for each field associated with each one of said selected public identifiers whether first access level criteria to access the data is met that is established in accordance with said user identifier;
retrieving the data of each said field that meets said first access level criteria, such that the data of each field of said document is independently accessed based on said secret identifier associated with a respective field;
determining for each field associated with each one of said selected public identifiers whether second access level criteria to access the list of sub-fields is met;
retrieving the list of sub-fields of each said field that meets said second access level criteria, such that the list of sub-fields of each field of said document is independently accessed based on said secret identifier associated with a respective field, wherein obtaining the at least a portion of said secret identifiers includes obtaining secret identifiers of sub-fields in the list of sub-fields retrieved; and
sending said retrieved data to said client device.

2. The electronic document management method according to claim 1, further comprising;
receiving at least one public identifier associated with a respective field of said document; and
obtaining, from said at least one public identifier, an associated secret identifier that is unavailable for public access and that identifies said respective field.

3. The document management method according to claim 2, in which said respective field includes at least one sub-field, the method further comprising verifying from said second access level criteria whether said sub-field is to be processed recursively by said method.

4. The document management method according to claim 3, further comprising parsing a tree in which a leaf represents said respective field of said document and includes an associated list of sub-fields included in said respective field.

5. The document management method according to claim 1, wherein at least some fields include at least one sub-field, the method further comprising verifying from said second access level criteria whether said sub-field is to be processed recursively by said method.

6. The document management method according to claim 5, further comprising parsing a tree in which a leaf represents each said field of said document and includes an associated list of sub-fields included in each said field.

7. The electronic document management method according to claim 1, wherein the predetermined field access definition comprises one of:
a first predetermined field access definition value indicating both that the user is not authorized to access the data stored in the content of the field and that the user is authorized to obtain the list of sub-fields stored in the content of the field; and
a second predetermined field access definition value indicating both that the user is authorized to access the data stored in the content of the field and that the user is not authorized to obtain the list of sub-fields stored in the content of the field.

8. A computer including a processor being operative to execute instructions to:
define a plurality of public identifiers and respective associated secret identifiers for said document, each public identifier and associated secret identifier being associated with at least one defined field of said document, each secret identifier being an internal identifier for the associated at least one defined field of said document, said public identifiers and said associated secret identifiers not being stored in said document, and said secret identifiers being unavailable for public access;
receive a request from a client device, sad request including at least a user identifier and an electronic document identifier that references said document;
obtain at least a portion of sad secret identifiers for said document based on said electronic document identifier;

obtain, for each field Identified by each secret identifier in the portion of said secret identifiers, at least one selected public identifier associated with the field identified by the secret identifier in accordance with a predetermined field access definition associated with the field;

determine for each field associated with each one of sad selected public identifiers whether first access level criteria to access data is met that is established in accordance with said user identifier;

retrieve the data of each said field that meets said first access level criteria, such that the data of each field of said document is independently accessed based on said secret identifier associated with a respective field;

determine for each field associated with each one of sad selected public identifiers whether second access level criteria to access a list of sub-fields is met;

retrieve the list of sub-fields stored in each said field that meets second access level criteria, such that the list of sub-fields of each field of said document is independently accessed based on sad secret identifier associated with a respective field, wherein obtaining the at least a portion of said secret identifiers includes obtaining secret identifiers of sub-fields in the list of sub-fields retrieved; and send said retrieved data to said client device.

9. The computer according to claim 8, wherein the processor is further operative to:

receive at least one public identifier associated with a respective field of said document; and obtain another secret identifier from said at least one public identifier, said another secret identifier being unavailable for public access and identifying said respective field of sad document to permit independent access to said respective field.

10. The computer according to claim 9, wherein the processor is further operative to determine if said public identifier, said another secret identifier and said second access level criteria indicate that a sub-field of said respective field is to be processed recursively.

11. The computer according to claim 10, wherein the processor is further operative to parse a tree in which a leaf represents said respective field of said document and includes an associated list of sub-fields contained in said respective field.

12. The computer according to claim 8, wherein the processor is further operative to determine if said user identifier and said second access level criteria indicate that a sub-field of at least one of each said field is to be processed recursively.

13. The computer according to claim 12, wherein the processor is further operative to parse a tree in which a leaf represents each said field of said document and includes an associated list of sub-fields contained in each said field.

14. A non-transitory recording medium readable by a computer and having recorded thereon a computer program including instructions that are executable by a processor in said computer to manage electronic documents, the computer program being adapted to:

define a plurality of public identifiers and respective associated secret identifiers for said document, each public identifier and associated secret identifier being associated with at least one defined field of said document, each secret identifier being an internal identifier for the associated at least one defined field of said document, said public identifiers and said associated secret identifiers not being stored in said document, and said secret identifiers being unavailable for public access;

receive a request from a client device, said request including at least a user identifier and an electronic', document identifier that references said document;

obtain at least a portion of said secret identifiers for said document based on said electronic document identifier;

obtain, for each field identified by each secret identifier in the portion of said secret identifiers, at least one selected public identifier associated with the field identified by the secret identifier in accordance with a predetermined field access definition associated with the field;

determine for each field associated with each one of said selected public identifiers whether first access level criteria to access data is met that is established in accordance with said user identifier;

retrieve the data of each said field that meets said first access level criteria, such that the data of each field of said document is independently accessed based on said secret identifier associated with a respective field;

determine for each field associated with each one of said selected public identifiers whether second access level criteria to access a list of sub-fields is met;

retrieve the list of sub-fields stored in each said field that meets second access level criteria, such that the list of sub-fields of each field of said document is independently accessed based on said secret identifier associated with a respective field, wherein obtaining the at least a portion of said secret identifiers includes obtaining secret identifiers of sub-fields in the list of sub-fields retrieved; and send said retrieved data to said client device.

15. The non-transitory recording medium according to claim 14, wherein the computer program is further adapted to:

receive at least one public identifier associated with a respective field of said document; and obtain another secret identifier from said at least one public identifier, said another secret identifier being unavailable for public access and identifying said respective field of said document to permit independent access to said respective field.

16. The non-transitory recording medium according to claim 15, wherein the computer program is further adapted to determine if said at least one public identifier and said second access level criteria indicate that a sub-field of said respective field is to be processed recursively.

17. The non-transitory recording medium according to claim 16, wherein the computer program is further adapted to parse a tree in which a leaf represents said respective field of said document and includes an associated list of sub-fields contained in said respective field.

18. The non transitory recording medium according to claim 14, wherein the computer program is further adapted to determine if said user identifier and said second access level criteria indicate that a sub-field of each said field is to be processed recursively.

19. The non-transitory recording medium according to claim 18, wherein the computer program is further adapted to parse a tree in which a leaf represents each said field of said document and includes an associated list of sub-fields contained in each said field.

20. A document server that is operative to host a document, comprising:

defining means for defining a plurality of public identifiers and respective associated secret identifiers for said document, each public identifier and associated secret identifier being associated with at least one defined field of said document, each secret identifier being an internal identifier for the associated at least one defined field of said document, said public identifiers and said associated secret identifiers not being stored in said document, and said secret identifiers being unavailable for public access;

receiving means for receiving a request from a client device, said request including at least a user identifier and an electronic document identifier that references said document;

obtaining means for obtaining at least a portion of said secret identifiers for said document based on said electronic document identifier;

obtaining means for obtaining, for each field identified by each secret identifier in the portion of said secret identifiers, at least one selected public identifier associated with the field identified by the secret identifier in accordance with a predetermined field access definition associated with the field;

first checking means for determining for each field associated with each one of said selected public identifiers whether first access level criteria to access data is met that is established in accordance with said user identifier;

first retrieving means for retrieving the data of each said field that meets said first access level criteria, such that the data of each field of said document is independently accessed based on said secret identifier associated with a respective field;

second checking means for determining for each field associated with each one of said selected public identifiers whether second access level criteria to access a list of sub-fields is met;

second retrieving means retrieving the list of sub-fields stored in each said field that meets second access level criteria, such that the list of sub-fields of each field of said document is independently accessed based on said secret identifier associated with a respective field, wherein the obtaining means is further for obtaining secret identifiers of sub-fields in the list of sub-fields retrieved; and sending means for sending said retrieved data to said client device.

* * * * *

UNITED STATES PATENT AND TRADEMARK OFFICE
CERTIFICATE OF CORRECTION

PATENT NO. : 9,292,703 B2  Page 1 of 1
APPLICATION NO. : 12/162210
DATED : March 22, 2016
INVENTOR(S) : Brochard et al.

It is certified that error appears in the above-identified patent and that said Letters Patent is hereby corrected as shown below:

In the claims

Column 8, Line 14, Claim 2, delete "comprising;" and insert -- comprising: --

Column 8, Line 63, Claim 8, delete "sad" and insert -- said --

Column 8, Line 66, Claim 8, delete "sad" and insert -- said --

Column 9, Line 1, Claim 8, delete "Identified" and insert -- identified --

Column 9, Line 6, Claim 8, delete "sad" and insert -- said --

Column 9, Line 14, Claim 8, delete "sad" and insert -- said --

Column 9, Line 21, Claim 8, delete "sad" and insert -- said --

Column 9, Line 34, Claim 9, delete "sad" and insert -- said --

Column 10, Line 2, Claim 14, delete "electronic'," and insert -- electronic --

Column 10, Line 50, Claim 18, delete "non transitory" and insert -- non-transitory --

Signed and Sealed this
Fifth Day of July, 2016

Michelle K. Lee
*Director of the United States Patent and Trademark Office*